US006976162B1

(12) United States Patent
Ellison et al.

(10) Patent No.: US 6,976,162 B1
(45) Date of Patent: Dec. 13, 2005

(54) PLATFORM AND METHOD FOR ESTABLISHING PROVABLE IDENTITIES WHILE MAINTAINING PRIVACY

(75) Inventors: Carl M. Ellison, Portland, OR (US); James A. Sutton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 841 days.

(21) Appl. No.: 09/605,605

(22) Filed: Jun. 28, 2000

(51) Int. Cl.[7] .............................. H04L 9/16; H04L 9/32

(52) U.S. Cl. ........................ 713/156; 713/176; 713/185

(58) Field of Search ................................ 713/156, 170, 713/175, 176, 185; 705/76

(56) References Cited

U.S. PATENT DOCUMENTS

| | | | | |
|---|---|---|---|---|
| 3,699,532 | A | 10/1972 | Schaffer et al. | 340/172.5 |
| 3,996,449 | A | 12/1976 | Attanasio et al. | 235/61.7 R |
| 4,207,609 | A | 6/1980 | Luiz et al. | 364/200 |
| 4,403,283 | A | 9/1983 | Myntti et al. | 364/200 |
| 4,419,724 | A | 12/1983 | Branigin et al. | 364/200 |
| 4,430,709 | A | 2/1984 | Schleupen | 364/200 |
| 4,621,318 | A | 11/1986 | Maeda | 364/200 |
| 4,759,064 | A | 7/1988 | Chaum | 380/30 |
| 4,802,084 | A | 1/1989 | Ikegaya et al. | 364/200 |
| 4,975,836 | A | 12/1990 | Hirosawa et al. | 364/200 |
| 5,187,802 | A | 2/1993 | Inoue et al. | 395/800 |
| 5,230,069 | A | 7/1993 | Brelsford et al. | 395/400 |
| 5,237,616 | A | 8/1993 | Abraham et al. | 380/49 |
| 5,287,363 | A | 2/1994 | Wolf et al. | 371/21.1 |
| 5,295,251 | A | 3/1994 | Wakui et al. | 385/400 |
| 5,361,375 | A | 11/1994 | Ogi | 395/800 |
| 5,469,557 | A | 11/1995 | Salt et al. | 395/425 |
| 5,506,975 | A | 4/1996 | Onodera | 395/375 |
| 5,555,385 | A | 9/1996 | Osisek | 395/401 |
| 5,555,414 | A | 9/1996 | Hough et al. | 395/734 |
| 5,560,013 | A | 9/1996 | Scalzi et al. | 395/700 |

(Continued)

FOREIGN PATENT DOCUMENTS

| | | | | |
|---|---|---|---|---|
| DE | 4217444 | A1 | 12/1992 | G06F/12/060 |
| EP | 0473913 | A2 | 3/1992 | G06F/9/46 |
| EP | 0600112 | A1 | 6/1994 | G06F/12/14 |
| EP | 0 602 867 | A1 | 6/1994 | G06F/12/14 |
| EP | 0 892 521 | A2 | 1/1999 | H04L/9/32 |
| EP | 0930567 | A3 | 7/1999 | G06F/9/445 |

(Continued)

OTHER PUBLICATIONS

Berg, Cliff, "How Do I Create a Signed Applet?", *Dr. Dobb's Journal,* (Aug. 1997), 1–9.

Chen, Andrew A., et al., "Safe and Protected Execution for the Morph/AMRM Reconfigurable Processor", *7th Annual IEEE Symposium, FCCM '99 Proceedings, XP010359180, ISBN 0-7695-0375-6, Los Alamitos, CA,* (Apr. 21, 1999), 209–221.

Compaq Computer Corporation, et al., "Trusted Computing Platform Alliance (TCPA) Main Specification Version 1.1a", (Dec. 2001),1–321.

(Continued)

*Primary Examiner*—Justin T. Darrow
(74) *Attorney, Agent, or Firm*—Steven D. Yates

(57) ABSTRACT

In one embodiment, a method for utilizing a pseudonym to protect the identity of a platform and its user is described. The method comprises producing a pseudonym that includes a public pseudonym key. The public pseudonym key is placed in a certificate template. Hash operations are performed on the certificate template to produce a certificate hash value, which is transformed from the platform. Thereafter, a signed result is returned to the platform. The signed result is a digital signature for the transformed certificate hash value. Upon performing an inverse transformation of the signed result, a digital signature of the certificate hash value is recovered. This digital signature may be used for data integrity checks for subsequent communications using the pseudonym.

6 Claims, 4 Drawing Sheets

U.S. PATENT DOCUMENTS

| | | | | |
|---|---|---|---|---|
| 5,564,040 | A | 10/1996 | Kubala | 395/487.04 |
| 5,574,936 | A | 11/1996 | Ryba et al. | 395/800 |
| 5,604,805 | A | 2/1997 | Brands | 380/30 |
| 5,606,617 | A | 2/1997 | Brands | 380/30 |
| 5,633,929 | A | 5/1997 | Kaliski, Jr. | 380/23 |
| 5,668,971 | A | 9/1997 | Neufeld | 711/111 |
| 5,684,948 | A | 11/1997 | Johnson et al. | 395/186 |
| 5,706,469 | A | 1/1998 | Kobayashi | 395/481 |
| 5,740,178 | A | 4/1998 | Jacks et al. | 371/121.5 |
| 5,752,046 | A | 5/1998 | Oprescu et al. | 345/750.01 |
| 5,809,546 | A | 9/1998 | Greenstein et al. | 711/164 |
| 5,825,880 | A | 10/1998 | Sudia et al. | 380/21 |
| 5,919,257 | A | 7/1999 | Trostle | 713/200 |
| 5,935,242 | A | 8/1999 | Madany et al. | 713/11 |
| 5,935,247 | A | 8/1999 | Pai et al. | 713/200 |
| 5,944,821 | A | 8/1999 | Angelo | 713/200 |
| 5,956,408 | A | 9/1999 | Arnold | 380/149 |
| 5,978,475 | A | 11/1999 | Schneier et al. | 380/4 |
| 6,035,374 | A | 3/2000 | Panwar et al. | 711/118 |
| 6,044,478 | A | 3/2000 | Green | 714/42 |
| 6,088,262 | A | 7/2000 | Nasu | 365/185.04 |
| 6,093,213 | A | 7/2000 | Favor et al. | 365/185.04 |
| 6,108,644 | A | 8/2000 | Goldschlag et al. | 703/27 |
| 6,131,166 | A | 10/2000 | Wong-Insley | 705/69 |
| 6,173,417 | B1 | 1/2001 | Merrill | 718/300 |
| 6,175,924 | B1 | 1/2001 | Arnold | 714/15 |
| 6,188,257 | B1 | 2/2001 | Buer | 327/143 |
| 6,199,152 | B1 | 3/2001 | Kelly et al. | 711/207 |
| 6,252,650 | B1 | 6/2001 | Nakamura | 355/69 |
| 6,275,933 | B1 | 8/2001 | Fine et al. | 713/2 |
| 6,282,650 | B1 | 8/2001 | Davis | 713/176 |
| 6,327,652 | B1 | 12/2001 | England et al. | 713/2 |
| 6,378,068 | B1 | 4/2002 | Foster et al. | 713/11 |
| 6,397,379 | B1 | 5/2002 | Yates, Jr. et al. | 717/5 |
| 6,507,904 | B1 | 1/2003 | Ellison et al. | 712/224 |
| 6,529,909 | B1 | 3/2003 | Bowman-Amuah | 707/10 |
| 6,560,627 | B1 | 5/2003 | McDonald et al. | 709/103 |
| 6,609,199 | B1 | 8/2003 | DeTreville | 713/172 |
| 6,615,278 | B1 | 9/2003 | Curtis | 702/310 |
| 6,633,963 | B1 | 10/2003 | Ellison et al. | 711/163 |
| 6,651,171 | B1 | 11/2003 | England et al. | 713/123 |
| 6,678,825 | B1 | 1/2004 | Ellison et al. | 713/200 |
| 6,684,326 | B1 | 1/2004 | Cromer et al. | 713/2 |
| 2001/0021969 | A1 | 9/2001 | Burger et al. | 711/207 |
| 2001/0027511 | A1 | 10/2001 | Wakabayashi et al. | 711/163 |
| 2001/0027527 | A1 | 10/2001 | Khidekel et al. | 713/201 |
| 2001/0037450 | A1 | 11/2001 | Metlitski et al. | 713/152 |
| 2002/0007456 | A1 | 1/2002 | Peinado et al. | 713/164 |
| 2002/0023032 | A1 | 2/2002 | Pearson et al. | 705/35 |
| 2002/0147916 | A1 | 10/2002 | Strongin et al. | 713/193 |
| 2002/0166061 | A1 | 11/2002 | Falik et al. | 713/200 |
| 2002/0169717 | A1 | 11/2002 | Challener | 705/40 |
| 2003/0018892 | A1 | 1/2003 | Tello | 713/164 |
| 2003/0074548 | A1 | 4/2003 | Cromer et al. | 713/1 |
| 2003/0115453 | A1 | 6/2003 | Grawrock | 713/155 |
| 2003/0126442 | A1 | 7/2003 | Glew et al. | 713/170 |
| 2003/0126453 | A1 | 7/2003 | Glew et al. | 713/183 |
| 2003/0159056 | A1 | 8/2003 | Cromer et al. | 713/183 |
| 2003/0188179 | A1 | 10/2003 | Challener et al. | 713/193 |
| 2003/0196085 | A1 | 10/2003 | Lampson et al. | 713/156 |
| 2004/0117539 | A1 | 6/2004 | Bennett et al. | 711/6 |

FOREIGN PATENT DOCUMENTS

| | | | | |
|---|---|---|---|---|
| EP | 0 961 193 | A2 | 12/1999 | G06F/1/00 |
| EP | 0 965 902 | A2 | 12/1999 | G06F/1/00 |
| EP | 1030237 | A1 | 8/2000 | G06F/1/00 |
| EP | 1 055 989 | A1 | 11/2000 | G01F/1/00 |
| EP | 1 056 014 | A1 | 11/2000 | G01F/12/14 |
| EP | 1 085 396 | A1 | 3/2001 | G06F/1/00 |
| EP | 1146715 | A1 | 10/2001 | H04L/29/06 |
| EP | 1 209 563 | A2 | 5/2002 | G06F/8/445 |
| EP | 1 271 277 | A2 | 1/2003 | G06F/1/00 |
| JP | 2000076139 | A | 3/2000 | G06F/12/14 |
| WO | WO 95/24696 | A2 | 9/1995 | G07F/1/00 |
| WO | WO9729567 | A1 | 8/1997 | H04K/1/10 |
| WO | WO 98/12620 | A1 | 3/1998 | G06F/1/24 |
| WO | WO9834365 | A1 | 8/1998 | H04K/1/00 |
| WO | WO9844402 | A1 | 10/1998 | G06F/1/00 |
| WO | WO9905600 | A2 | 2/1999 | G06F/12/00 |
| WO | WO 99/18511 | A1 | 4/1999 | G06F/12/10 |
| WO | WO9957863 | A1 | 11/1999 | H04L/29/06 |
| WO | WO 99/65579 | A1 | 12/1999 | A63F/5/04 |
| WO | WO 00/21238 | A1 | 4/2000 | H04L/9/00 |
| WO | WO0062232 | A1 | 10/2000 | G06F/17/60 |
| WO | WO0127723 | A1 | 4/2001 | G06F/1/00 |
| WO | WO0127821 | A2 | 4/2001 | G06F/17/60 |
| WO | WO 01/63994 | A2 | 8/2001 | H05K/5/00 |
| WO | WO0175565 | A2 | 10/2001 | G06F/1/00 |
| WO | WO 01/75595 | A2 | 10/2001 | G06F/9/00 |
| WO | WO0175595 | A2 | 10/2001 | G06F/9/00 |
| WO | WO 02/01794 | A2 | 1/2002 | H04L/9/32 |
| WO | WO9909482 | A1 | 1/2002 | G06F/12/14 |
| WO | WO0217555 | A2 | 2/2002 | H04L/9/00 |
| WO | WO 02/060121 | A1 | 8/2002 | H04L/9/32 |
| WO | WO0175564 | A2 | 10/2002 | G06F/1/00 |
| WO | WO02086684 | A2 | 10/2002 | G06F/1/00 |
| WO | WO 03/058412 | A2 | 7/2003 | G06F/1/00 |

OTHER PUBLICATIONS

Davida, George I., et al., "Defending Systems Against Viruses through Cryptographic Authentication", *Proceedings of the Symposium on Security and Privacy,* IEEE Comp. Soc. Press, ISBN 0–8186–1939–2,(May 1989).

Goldberg, Robert P., "Survey of Virtual Machine Research", *Computer Magazine,* (Jun. 1974), cover, contents, 34–35.

Gong, Li , et al., "Going Behond the Sandbox: An Overview of the New Security Architecture in the Java Development Kit 1.2", *Proceedings of the USENIX Symposium on Internet Technologies and Systems,* Monterey, CA,(Dec. 1997).

Gum, P.H., "System/370 Extended Architecture: Facilities for Virtual Machines", *IBM J. Research Development, vol. 27, No. 6,* (Nov. 1983),530–544.

Heinrich, Joe , "MIPS R4000 Microprocessor User's Manual, Second Edition", *Chapter 4 "Memory Management",* (Jun. 11, 1993),61–97.

IBM, "Information Display Technique for a Terminate Stay Resident Program IBM Technical Disclosure Bulletin", *TDB–ACC–No. NA9112156, vol. 34, Issue 7A,* (Dec. 1, 1991), 156–158.

Intel, "Intel386 DX Microprocessor 32–Bit CHMOS Microprocessor With Integrated Memory Mangaement", (1995), 1–56.

Karger, Paul A., et al., "A VMM Security Kernal for the VAX Architecture", *Proceedings of the Symposium on Research in Security and Privacy, XP010020182, ISBN 0–8186–2060–9, Boxborough, MA,* (May 7, 1990),2–19.

Kashiwagi, Kazuhiko , et al., "Design and Implementation of Dynamically Reconstructing System Software", *Software Engineering Conference,* Proceedings 1996 Asia–Pacific Seoul, South Korea Dec. 4–7, 1996, Los Alamitos, CA USA, IEEE Comput. Soc, US, ISBN 0–8186–7638–8,(1996).

Lawton, Kevin , et al., "Running Multiple Operating Systems Concurrently on an IA32 PC Using Virtualization Techniques", http://www.plex86.org/research/paper.txt, (Nov. 29, 1999),1–31.

Luke, Jahn , et al., "Replacement Strategy for Aging Avionics Computers", *IEEE AES Systems Magazine,* XP002190614,(Mar. 1999).
Motorola, "M68040 User's Manual", (1993), cover, vi–xxiii, 1–1 to 8–32.
Richt, Stefan , et al., "In–Circuit–Emulator Wird Echtzeittauglich", *Elektronic, Franzis Verlag GMBH, Muchen, DE,* vol. 40, No. 16, XP000259620,(100–103),Aug. 6, 1991.
Robin, John S., et al., "Analysis of the Pentium's Ability to Support a Secure Virtual Machine Monitor", *Proceedings of the 9th USENIX Security Symposium, XP002247347, Denver, Colorado,* (Aug. 14, 2000),1–17.
Rosenblum, M. , "Virtual Platform: A Virtual Machine Monitor for Commodity PC", *Proceedings of the 11th Hotchips Conference,* (Aug. 17, 1999), 185–196.
Saez, Sergio , et al., "A Hardware Scheduler for Complex Real–Time Systems", *Proceedings of the IEEE Internatinal Symposium on Industrial Electronics,* XP002190615,(Jul. 1999),43–48.
Sherwood, Timothy , et al., "Patchable Instruction ROM Architecture", *Department of Computer Science and Engineering, University of California, San Diego, La Jolla, CA,* (Nov. 2001), 24–33.
Stefan, Brands, "Restrictive Blinding Of Secret–Key Certificates", Springer–Verlag, 1995, XP002201306 German, Chapter 3, Abstract.
Menezes, Oorschot, "Handbook of Applied Cryptography", 1997, CRC Press LLC, USA XP002201307, p. 475.
John Crawford, "Architecture of the Intel 80386", IEEE International Conference on Computer Design: VLSI in Computers, Oct. 6–9, 1986, pp. 155–160, New York, USA.
George Coulouris, et al., "Distributed Systems: Concepts and Designs: 14.4: Concurrency Control in Distributed Transactions", 1994, pp. 422–424, Second Edition, Addison–Wesley Publishing Company Inc.
R.S. Fabry, "Capability–Based Addressing", Communications of the ACM, Jul. 1974, pp. 403–412, vol. 17, No. 7, USA.
Dr. Gideon Frieder, "The Architecture and Operational Characteristics of the VMX Host Machine", IEEE, 1982, pp. 9–16, USA.
S. Nanba, et al., "VM/4(2) ACOS–4 Virtual Machine Architecture", IEEE, 1985, pp. 171–178, USA.
Mendel Rosenblum, "VMware's Virtual Platform", Proceedings of Hot Chips 11, Aug. 1999, pp. 185–196, USA.
Intel Corporation, "IA–64 System Abstraction Layer Specification", Jan. 2000, pp. 1–1 to 3–21, XP–002253057, USA.
Intel Corporation, "Intel 82802AB/82802AC Firmware Hub (FWH)", Nov. 2000, pp. 1–28, XP–002257561, USA.
Intel Corporation, "IA–32 Intel Architecture Software Developer's Manual: vol. 3: System Programming Guide", 2003, Chapter 13: System Management, pp. 13–1 to 13–24, USA.
Hewlitt–Packard Company, "Mobile Security Overview", Sep. 2002, pp. 1–9, USA.
RSA Security, "Software Authenticators", 2004, pp. 1–2, Retrieved from the WWW on Jun. 1, 2004: <rsasecurity-.com/node.asp?id–1313>.
RSA Security, "Hardware Authenticators", 2004, pp. 1–2, Retrieved from the WWW on Jun. 1, 2004: <rsasecurity.com/node.asp?id–1158>.
RSA Security, "RSA SecurID Authenticators: The Gold Standard in Two–Factor User Authentication", 2003, pp. 1–2.
IBM Corporation, "IBM ThinkPad T30 notebooks", Apr. 2002, pp. 1–6.
"Trusted Computing Platform Alliance (TCPA): Main Specification Version 1.0", Jan. 2001, pp. 122–227, XP–002272822, USA.
Joe Heinrich, MIPS R4000 Miroprocessor User's Manual: Chapter 4: Memory Management, 1994, pp. 61–97, Second Edition, MIPS Technologies, Inc.
Alfred J. Menezes, et al., "Handbook of Applied Cryptography: Ch. 10: Identification and Entity Authentication", Oct. 1996, pp. 403–570, CRC Press, ISBN: 0–8493–8523–7.
Bruce Schneier, "Applied Cryptography: Chapter 2: Protocol Building Blocks", 1996, pp. 28–33, Second Edition, XP–002251738, John Wiley & Sons, USA.
Bruce Schneier, Applied Cryptography: Chapter 3: Basic Protocols, 1996, pp. 47–52 (XP–00293871) and pp. 56–65 (XP–002138607), Second Edition, John Wiley & Sons, USA.
Bruce Schneier, Applied Cryptography: Chapter 8: Key Management, 1996, pp. 169–187, Second Edition, XP–002111449, John Wiley & Sons, USA.
Bruce Schneier, Applied Cryptography: Chapter 10: Using Algorithms, 1996, pp. 216–217, Second Edition, John Wiley & Sons, USA.
Bruce Schneier, Applied Cryptography: Chapter 19: Public–Key Algorithms, 1996, pp. 461–473, Second Edition, John Wiley & Sons, USA.
Bruce Schneier, Applied Cryptography: Chapter 22: Key–Exchange Algorithms, 1996, pp. 518–522, Second Edition, John Wiley & Sons, USA.

PLATFORM AND METHOD FOR ESTABLISHING PROVABLE IDENTITIES WHILE MAINTAINING PRIVACY

FIELD

This invention relates to the field of data security. In particular, the invention relates to a platform and method that protects an identity of the platform through creation and use of pseudonyms.

BACKGROUND

Advances in technology have opened up many opportunities for applications that go beyond the traditional ways of doing business. Electronic commerce (e-commerce) and business-to-business (B2B) transactions are now becoming popular, reaching the global markets at a fast rate. Unfortunately, while electronic platforms like computers provide users with convenient and efficient methods of doing business, communicating and transacting, they are also vulnerable for unscrupulous attacks. This vulnerability has substantially hindered the willingness of content providers from providing their content in a downloaded, digital format.

Currently, various mechanisms have been proposed to verify the identity of a platform. This is especially useful to determine if the platform features a "trusted" device; namely, the device is configured to prevent digital content from being copied in a non-encrypted format without authorization. One verification scheme involves the use of a unique serial number assigned to a platform for identification of that platform. Another verification scheme, performed either independently from or cooperatively with the previously described verification scheme, involves the use of a permanent key pair. The permanent key pair includes (i) a unique public key that identifies the platform and (ii) a private key that is permanently stored in memory of the trusted device. The private key is confidential and is not provided outside the trusted device. However, these verification schemes pose a number of disadvantages.

For example, each of these verification schemes is still subject to data aggregation attacks. "Data aggregation" involves the collection and analysis of data transmitted from a platform over a period of time. Thus, the use of platform serial numbers and permanent keys for identification purposes has recently lead to consumer privacy concerns. Also, for both verification mechanisms, a user cannot easily and reliably control access to and use of the platform identity on a per-use basis.

BRIEF DESCRIPTION OF THE DRAWINGS

The features and advantages of the present invention will become apparent from the following detailed description of the present invention in which.

DETAILED DESCRIPTION

Figure 1:
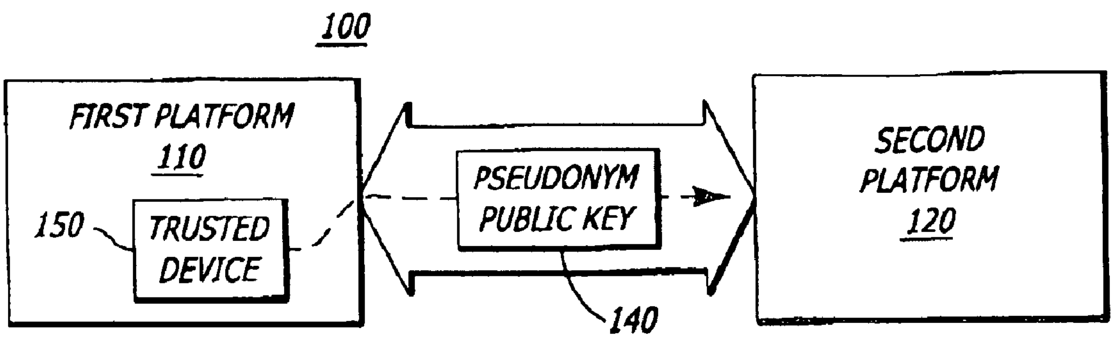
FIG. 1 is a block diagram of an illustrative embodiment of a system utilizing the present invention.

The present invention relates to a platform and method for protecting the identity of the platform through the creation and use of pseudonyms. Herein, certain details are set forth in order to provide a thorough understanding of the present invention. It is apparent to a person of ordinary skill in the art, however, that the present invention may be practiced through many embodiments other that those illustrated. Well-known circuits and cryptographic techniques are not set forth in detail in order to avoid unnecessarily obscuring the present invention.

In the following description, terminology is used to discuss certain features of the present invention. For example, a "platform" includes hardware and/or software that process information. Examples of a platform include, but are not limited or restricted to any of the following: a computer (e.g., desktop, a laptop, a hand-held, a server, a workstation, etc.); data transmission equipment (e.g., a router, switch, facsimile machine, etc.), wireless equipment (e.g., cellular base station, telephone handset, etc.); or television set-top box. "Software" includes code that, when executed, performs a certain function. "Information" is defined as one or more bits of data, address, and/or control.

With respect to cryptographic functionality, a "cryptographic operation" is an operation performed for additional security on information. These operations may include encryption, decryption, hash computations, and the like. In certain cases, the cryptographic operation requires the use of a key, which is a series of bits. For asymmetric key cryptography, a device is associated with unique, permanent key pair that includes a public key and a private key.

In addition, asymmetric key cryptography normally utilizes a root certificate. A "root certificate" is a public key at the origination of a digital certificate chain and provides a starting point for all subsequent digital certificates. In general, a "digital certificate" includes information used to authenticate a sender of information. For example, in accordance with CCITT Recommendation X.509: The Directory—Authentication Framework (1988), a digital certificate may include information (e.g., a key) concerning a person or entity being certified, namely encrypted using the private key of a certification authority. Examples of a "certification authority" include an original equipment manufacturer (OEM), a software vendor, a trade association, a governmental entity, a bank or any other trusted business or person. A "digital certificate chain" includes an ordered sequence of two or more digital certificates arranged for authorization purposes as described below, where each successive certificate represents the issuer of the preceding certificate.

A "digital signature" includes digital information signed with a private key of its signatory to ensure that the digital information has not been illicitly modified after being digitally signed. This digital information may be provided in its entirety or as a hash value produced by a one-way hash operation.

A "hash operation" is a one-way conversion of information to a fixed-length representation referred to as a "hash value". Often, the hash value is substantially less in size than the original information. It is contemplated that, in some cases, a 1:1 conversion of the original information may be performed. The term "one-way" indicates that there does not readily exist an inverse function to recover any discernible portion of the original information from the fixed-length hash value. Examples of a hash function include MD5 provided by RSA Data Security of Redwood City, Calif., or Secure Hash Algorithm (SHA-1) as specified a 1995 publication Secure Hash Standard FIPS 180-1 entitled "Federal Information Processing Standards Publication" (Apr. 17, 1995).

Referring to FIG. 1, a block diagram of an illustrative embodiment of a system 100 utilizing the present invention is shown. The system 100 comprises a first platform 110 and a second platform 120. First platform 110 is in communication with second platform 120 via a link 130. A "link" is broadly defined as one or more information-carrying mediums (e.g., electrical wire, optical fiber, cable, bus, or wireless signaling technology). When requested by the user, first platform 110 generates and transmits a pseudonym public key 140 (described below) to second platform 120. In response, second platform 120 is responsible for certifying, when applicable, that pseudonym public key 140 was generated by a trusted device 150 within first platform 110.

Figure 2:
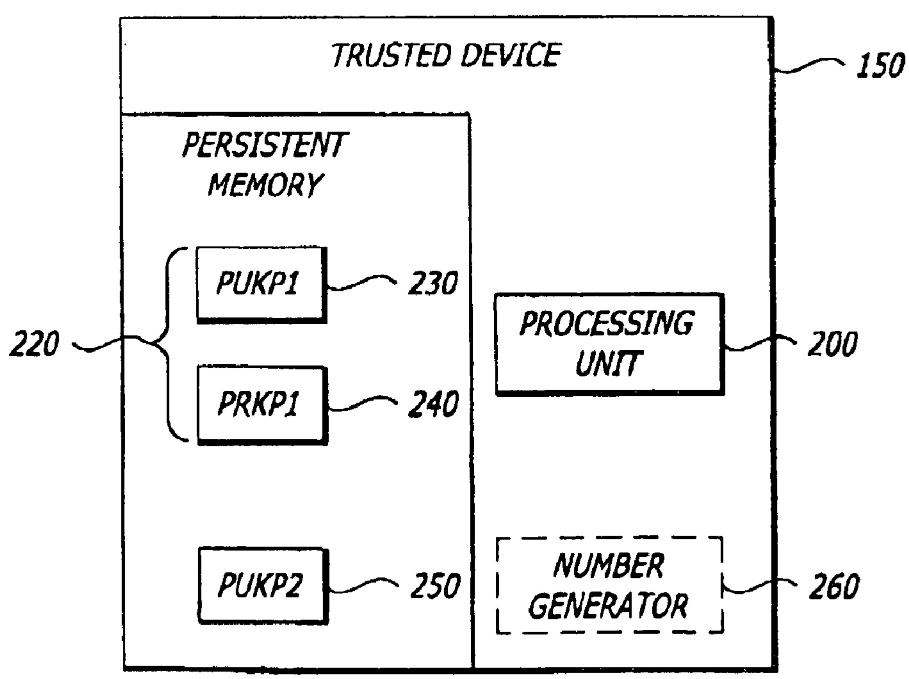
FIG. 2 is a block diagram of an illustrative embodiment of the trusted logic employed within the first platform of FIG. 1.

Referring now to FIG. 2, in one embodiment, trusted device 150 comprises hardware and/or protected software. Software is deemed "protected" when access control schemes are employed to prevent unauthorized access to any routine or subroutine of the software. More specifically, device 150 is one or more integrated circuits that prevents tampering or snooping from other logic. The integrated circuit(s) may be placed in a single integrated circuit (IC) package or a multi-IC package. A package provides additional protection against tampering. Of course, device 150 could be employed without any IC packaging if additional protection is not desired.

Herein, device 150 comprises a processing unit 200 and a persistent memory 210 (e.g., non-volatile, battery-backed random access memory "RAM", etc.). Processing unit 200 is hardware that is controlled by software that internally processes information. For example, processing unit 200 can perform hash operations, perform logical operations (e.g. multiplication, division, etc.), and/or produce a digital signature by digitally signing information using the Digital Signature Algorithm. Persistent memory 210 contains a unique asymmetric key pair 220 programmed during manufacture. Used for certifying pseudonyms, asymmetric key pair 220 includes a public key (PUKP1) 230 and a private key (PRKP1) 240. Persistent memory 210 may further include a public key 250 (PUKP2) of second platform 120, although it may be placed in volatile memory (e.g., RAM, register set, etc.) within device 150 if applicable.

In this embodiment, device 150 further comprises a number generator 260 such as a random number generator or a pseudo-random number generator. Number generator 260 is responsible for generating a bit stream that is used, at least in part, to produce one or more pseudonyms. A "pseudonym" is an alias identity in the form of an alternate key pair used to establish protected communications with another platform and to identify that its platform includes trusted device 150. The pseudonym also supports a challenge/response protocol and a binding of licensing, secrets and other access control information to the specific platform. It is contemplated, however, that number generator 260 may be employed externally from device 150. In that event, the greater security would be realized by platform 110 if communications between number generator 260 and device 150 were protected.

Figure 3:
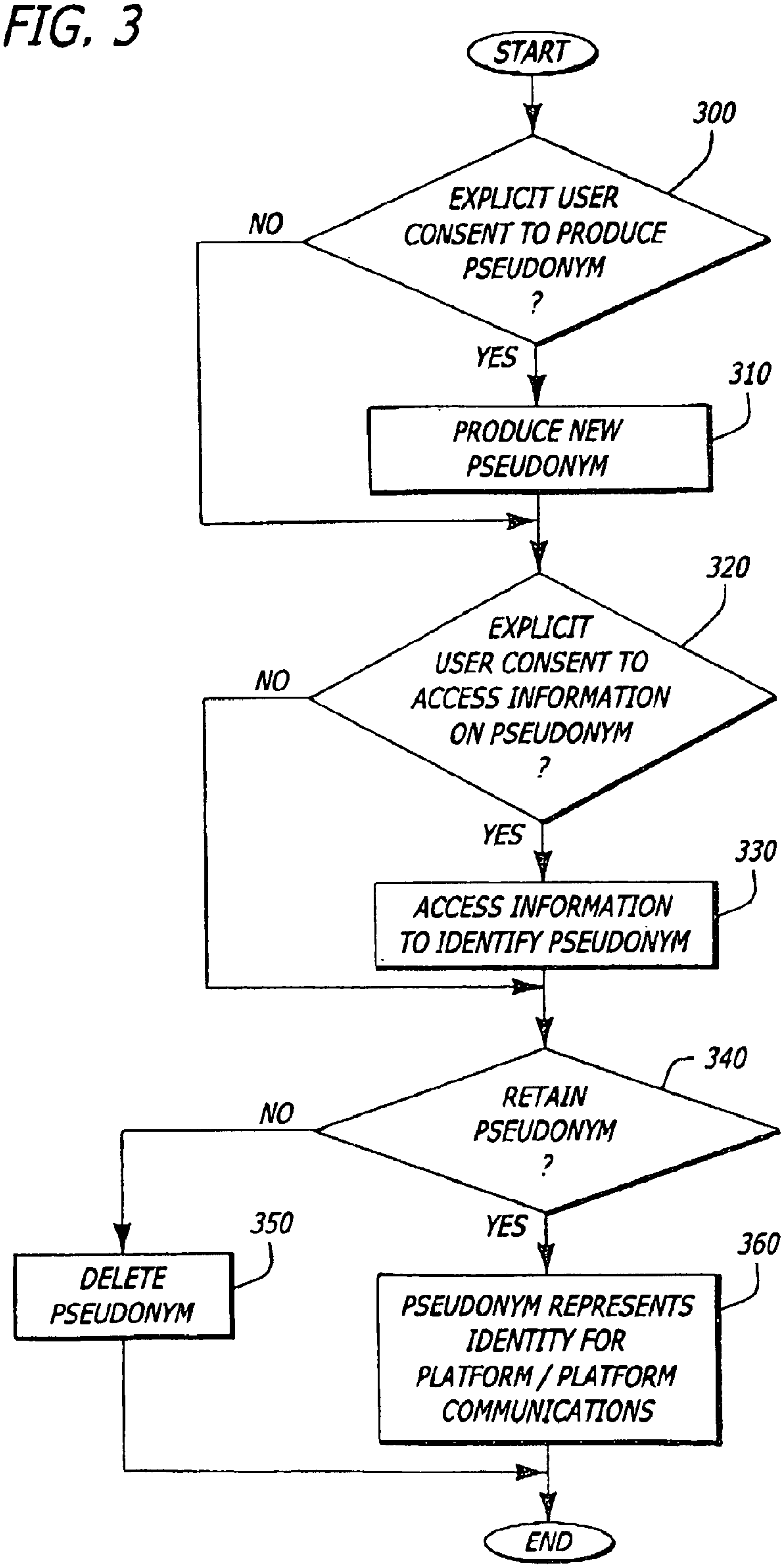
FIG. 3 is a flowchart of an illustrative embodiment describing allocation and use of a pseudonym produced within the first platform of FIG. 1.

Referring to FIG. 3, a flowchart of an illustrative embodiment describing allocation and use of a pseudonym is shown. To fully protect the user's privacy, the user should have positive control of the production, allocation and deletion of pseudonyms. Thus, in response to explicit user consent, a new pseudonym is produced (blocks 300 and 310). Also, to access information (e.g., label, public key, etc.) that identifies an existing pseudonym, explicit user consent is needed (blocks 320 and 330). Explicit user consent may be given by supplying a pass-phrase (e.g., series of alphanumeric characters), a token, and/or a biometric characteristic to the trusted device. For example, in one embodiment, a user pass-phrase may be entered through a user input device (e.g., a keyboard, mouse, keypad, joystick, touch pad, track ball, etc.) and transferred to the trusted device. In another embodiment, memory external to the logic may contain pseudonyms encrypted with a hash value of a user pass-phrase. Any of these pseudonyms can be decrypted for use by again supplying the user pass-phrase.

Once a pseudonym has been produced and allocated for use in communications with a remote platform, this pseudonym represents the persistent platform identity for that platform/platform communications, so long as the user chooses to retain the pseudonym (blocks 340, 350 and 360).

Figure 4:
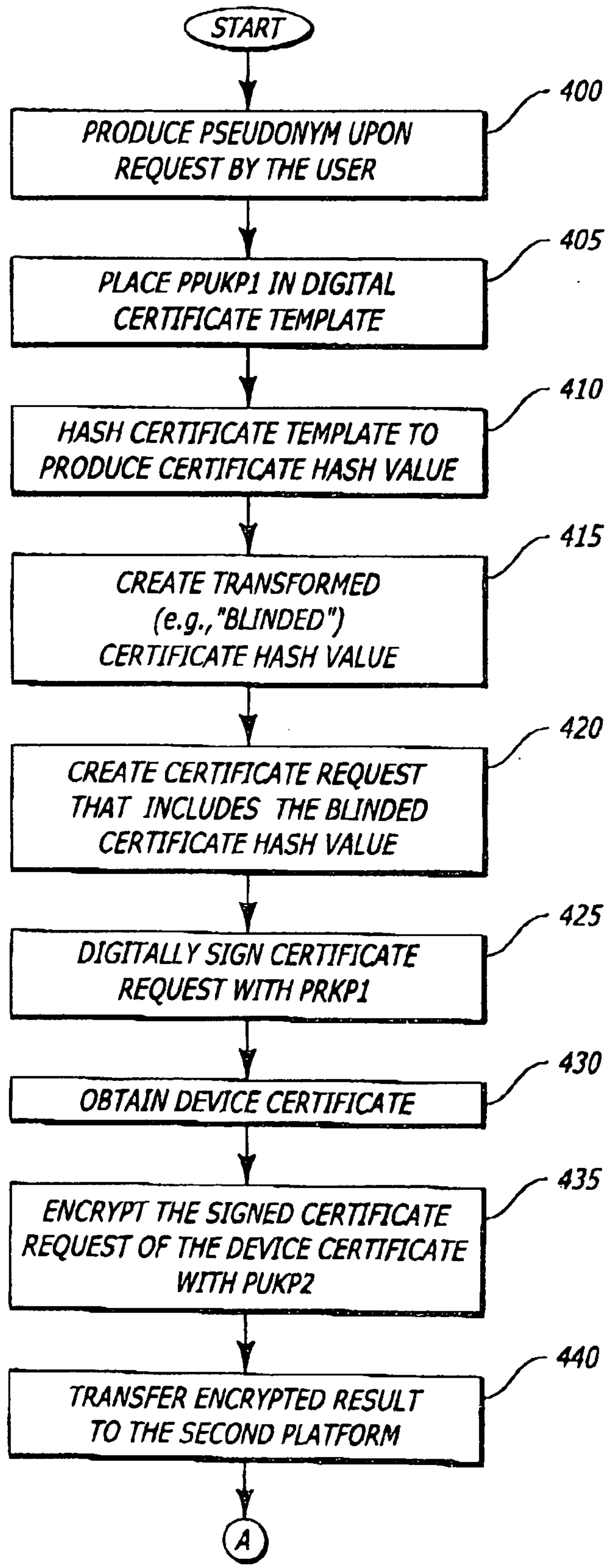
FIGS. 4 and 5 are flowcharts of an illustrative embodiment of the production and certification of pseudonyms.
Figure 5:
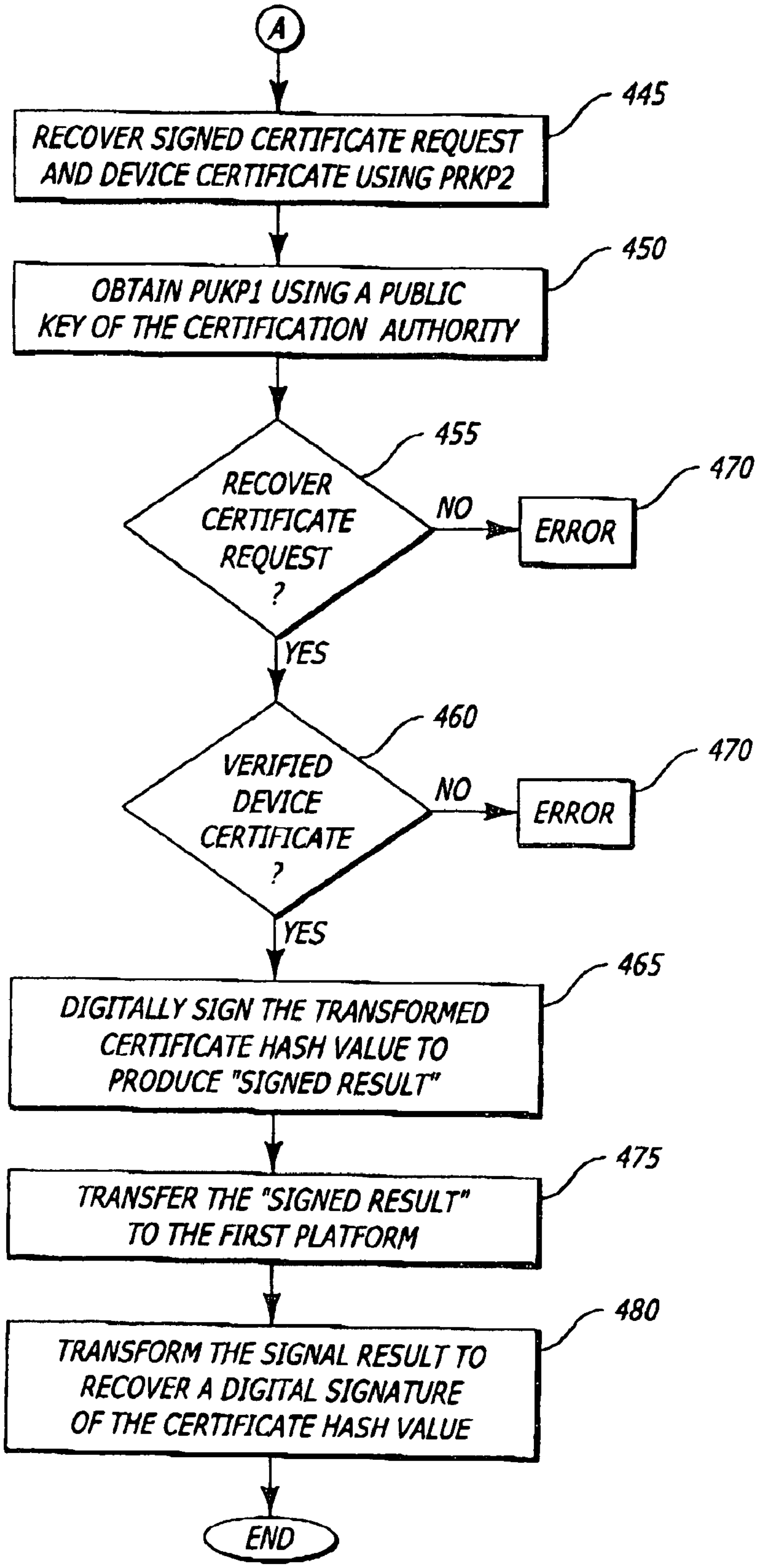

Referring now to FIGS. 4 and 5, flowcharts of an illustrative embodiment of the production and certification of pseudonyms are shown. Initially, upon receiving a request by the user, the pseudonym is produced by the device in coordination with a number (block 400). A pseudonym public key (PPUKP1) is placed in a digital certificate template (block 405). The digital certificate template may be internally stored within the first platform or provided by the second platform in response to a request for certification from the first platform. Thereafter, the digital certificate template undergoes a hash operation to produce a certificate hash value (block 410).

Thereafter, the certificate hash value undergoes a transformation similar to that described in U.S. Pat. Nos. 4,759,063 and 4,759,064 to create a "blinded" certificate hash value (block 415). In particular, the certificate hash value is multiplied by a pseudo-random number (e.g., a predetermined number raised to a power that is pseudo-randomly select). The pseudo-random power is maintained in confidence within the first platform (e.g., placed in persistent memory 210 of FIG. 2). A certification request, including at least the transformed (or blinded) certificate hash value, is created (block 420). The certification request is digitally signed with the private key (PRKP1) of the first platform (block 425). A device certificate, namely a digital certificate chain that includes the public key (PUKP1) of the first platform in one embodiment, is retrieved or generated to accompany the signed certificate request (block 430). In this embodiment, the device certificate features a high-level certificate including PUKP1 and a lowest level certificate including the root certificate. Of course, the device certificate may be a single digital certificate including PUKP1. Both the signed certificate request and device certificate are encrypted with the public key (PUKP2) of the second platform and then transferred to the second platform (blocks 435 and 440).

At the second platform, the signed certificate request and device certificate are recovered after being decrypted using the private key (PRKP2) of the second platform (block 445). The public key (PUKP1) of the first platform may be obtained using a public key of the certification authority responsible for signing the device certificate (block 450). If the second platform can recover the certificate request, the second platform verifies the device certificate back to the root certificate (blocks 455 and 460). If the certificate request is recovered and the device certificate is verified, the transformed (or blinded) certificate hash value is digitally signed to produce a "signed result" (block 465). Otherwise, if either the transformed (or blinded) certificate hash value cannot be determined or the device certificate cannot be verified, an error message is returned to the first platform (block 470).

Upon receipt of the signed result from the second platform, the first platform performs an inverse transformation on the signal result. For example, in this illustrative embodiment, the first platform divides the signed result by an inverse of the pseudo-random number (e.g., the predetermined number raised to an inverse of the pseudo-random power) to recover a digital signature of the certificate hash value (blocks 475 and 480). The digital signature is stored with one or more pseudonyms for use in subsequent communications with other platforms to identify that the first platform includes a trusted device.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A device comprising:

a processing unit; and a persistent memory including a first key pair and at least one pseudonym for use in communications with a remotely located device and in identifying that a platform containing the device is secure, wherein the at least one pseudonym includes a second key pair that is erased after a communication session with the remotely located device has concluded.

2. The device of claim 1 further comprising:

a number generator to assist in producing the at least one pseudonym.

3. A method for utilizing a persistent memory of a device, comprising:

storing in the persistent memory a first key pair; and storing in the persistent memory at least one pseudonym for use in communications with a remotely located device and in identifying that a platform containing the device is secure, wherein the at least one pseudonym includes a second key pair that is erased after a communication session with the remotely located device has concluded.

4. The method of claim 3 further comprising:

utilizing a number generator to assist in producing the at least one pseudonym.

5. A machine accessible medium having associated instructions for utilizing a persistent memory of a device, the instructions, when accessed, result in one or more machines performing:

storing in the persistent memory a first key pair; and storing in the persistent memory at least one pseudonym for use in communications with a remotely located device and in identifying that a platform containing the device is secure, wherein the at least one pseudonym includes a second key pair that is erased after a communication session with the remotely located device has concluded.

6. The medium of claim 5, wherein the instructions include further instructions, which when accessed, result in the one or more machines performing:

utilizing a number generator to assist in producing the at least one pseudonym.

* * * * *